United States Patent
Kim et al.

(10) Patent No.: US 11,272,562 B2
(45) Date of Patent: Mar. 8, 2022

(54) METHOD FOR ENB TO TRANSMIT DOWNLINK DATA TO REMOTE UE IN WIRELESS COMMUNICATION SYSTEM AND DEVICE THEREFOR

(71) Applicant: LG ELECTRONICS INC., Seoul (KR)

(72) Inventors: Laeyoung Kim, Seoul (KR); Youngdae Lee, Seoul (KR); Jaewook Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 16/619,411

(22) PCT Filed: Jun. 7, 2018

(86) PCT No.: PCT/KR2018/006455
§ 371 (c)(1),
(2) Date: Apr. 28, 2020

(87) PCT Pub. No.: WO2018/226034
PCT Pub. Date: Dec. 13, 2018

(65) Prior Publication Data
US 2020/0281040 A1    Sep. 3, 2020

Related U.S. Application Data

(60) Provisional application No. 62/521,535, filed on Jun. 19, 2017, provisional application No. 62/520,622, (Continued)

(51) Int. Cl.
*H04W 40/22* (2009.01)
*H04W 8/00* (2009.01)
(Continued)

(52) U.S. Cl.
CPC ........ *H04W 76/25* (2018.02); *H04W 68/005* (2013.01); *H04W 76/14* (2018.02); *H04W 88/08* (2013.01)

(58) Field of Classification Search
None
See application file for complete search history.

(56) References Cited

U.S. PATENT DOCUMENTS 8,554,199 B2    10/2013  Park
10,075,931 B2 *  9/2018  Jung ..................... H04W 40/26
(Continued)

FOREIGN PATENT DOCUMENTS

WO    2016133344 A1    8/2016
WO    2017015788 A1    2/2017
WO    2017030572 A1    2/2017

*Primary Examiner* — Gary Lafontant
(74) *Attorney, Agent, or Firm* — Dentons US LLP

(57) ABSTRACT

An embodiment of the present invention relates to a method for transmitting downlink data to remote UE, the method for an eNB to transmit downlink data to a remote UE in a wireless communication system comprises a step in which the eNB receives out of coverage related information on the remote UE; a step in which the eNB determines that the relay UE of the remote UE and the remote UE are maintained in a connected mode after receiving the out of coverage related information on the remote UE; and a step of transmitting downlink data to the remote UE.

10 Claims, 15 Drawing Sheets

Related U.S. Application Data filed on Jun. 16, 2017, provisional application No. 62/516,033, filed on Jun. 6, 2017.

(51) Int. Cl.
*H04W 40/12* (2009.01)
*H04W 76/25* (2018.01)
*H04W 76/14* (2018.01)
*H04W 68/00* (2009.01)
*H04W 88/08* (2009.01)

(56) References Cited

U.S. PATENT DOCUMENTS

| | | | |
|---|---|---|---|
| 2015/0319724 A1* | 11/2015 | Chae | H04W 56/0025 370/315 |
| 2016/0337954 A1 | 11/2016 | Gulati et al. | |
| 2018/0035354 A1* | 2/2018 | Martin | H04W 40/22 |
| 2019/0028959 A1* | 1/2019 | Svedevall | H04W 28/0289 |

* cited by examiner

Scenario 1 : OOC and connected to relay

Scenario 2 : OOC and no connected to relay

Scenario 3 : In coverage and no connection to relay

Scenario 4 : In coverage and connected to relay

METHOD FOR ENB TO TRANSMIT DOWNLINK DATA TO REMOTE UE IN WIRELESS COMMUNICATION SYSTEM AND DEVICE THEREFOR

CROSS-REFERENCE TO RELATED APPLICATIONS

This application is the National Stage filing under 35 § U.S.C. 371 of International Application No. PCT/KR2018/006455, filed on Jun. 7, 2018, which claims the benefit of U.S. Provisional Application Nos. 62/521,535 filed on Jun. 19, 2017, 62/520,622 filed on Jun. 16, 2017 and 62/516,033 filed on Jun. 6, 2017, the contents of which are all hereby incorporated by reference herein in their entirety.

TECHNICAL FIELD

The present disclosure relates to a wireless communication system, and more particularly, to a method for an evolved node B (eNB) to transmit downlink data to an out-of-coverage remote user equipment (UE) and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

The object of the present disclosure is to provide a method of efficiently delivering a network access service (Indirect 3GPP Communication) to a remote UE through a relay UE, and more particularly, a method of efficiently delivering mobile terminating traffic to an out-of-coverage remote UE.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solution

In an aspect of the present disclosure, provided is a method of transmitting, by an evolved Node B (eNB), downlink data to a remote user equipment (UE) in a wireless communication system. The method may include: receiving, by the eNB, out-of-coverage-related information on the remote UE; determining, by the eNB, to keep the remote UE and a relay UE for the remote UE in a connected mode after receiving the out-of-coverage-related information on the remote UE; and transmitting the downlink data to the remote UE.

In another aspect of the present disclosure, provided is an evolved node B (eNB) device for transmitting downlink data to a remote user equipment (UE) in a wireless communication system. The eNB device may include a transceiver and a processor. The processor may be configured to: receive out-of-coverage-related information on the remote UE; determine to keep the remote UE and a relay UE for the remote UE in a connected mode after receiving the out-of-coverage-related information on the remote UE; and transmit the downlink data to the remote UE.

When determining to keep the remote UE and the relay UE for the remote UE in the connected mode, the eNB may skip initiating an inactivity timer for switching both the remote UE and the relay UE to an idle mode.

When determining to keep the remote UE and the relay UE for the remote UE in the connected mode, the eNB may always skip performing paging to the relay UE based on occurrence of the downlink data.

The remote UE may become out of coverage while in an idle state.

The eNB may activate a user plane of the remote UE.

The remote UE may attach to the eNB through the relay UE while out of the coverage.

The remote UE may become out of the coverage while in a connected state.

The out-of-coverage-related information may correspond to one of the following information: information on whether the remote UE is out of the coverage; information on a signal strength/state of LTE-Uu (the LTE-Uu may be interpreted as an interface towards a network) of the remote UE; information indicating that the remote UE is directly unreachable to the network; and information indicating that communication through the LTE-Uu is impossible.

When the remote UE is in the coverage, the eNB may receive in-coverage-related information from the remote UE.

After receiving the in-coverage-related information, the eNB may be capable of initiating the inactivity timer.

After receiving the in-coverage-related information, the eNB may transmit a paging message or the downlink data to the remote UE based on the occurrence of the downlink data

Advantageous Effects

According to the present disclosure, downlink data may be efficiently transmitted to a remote UE even though the remote UE is out of coverage.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
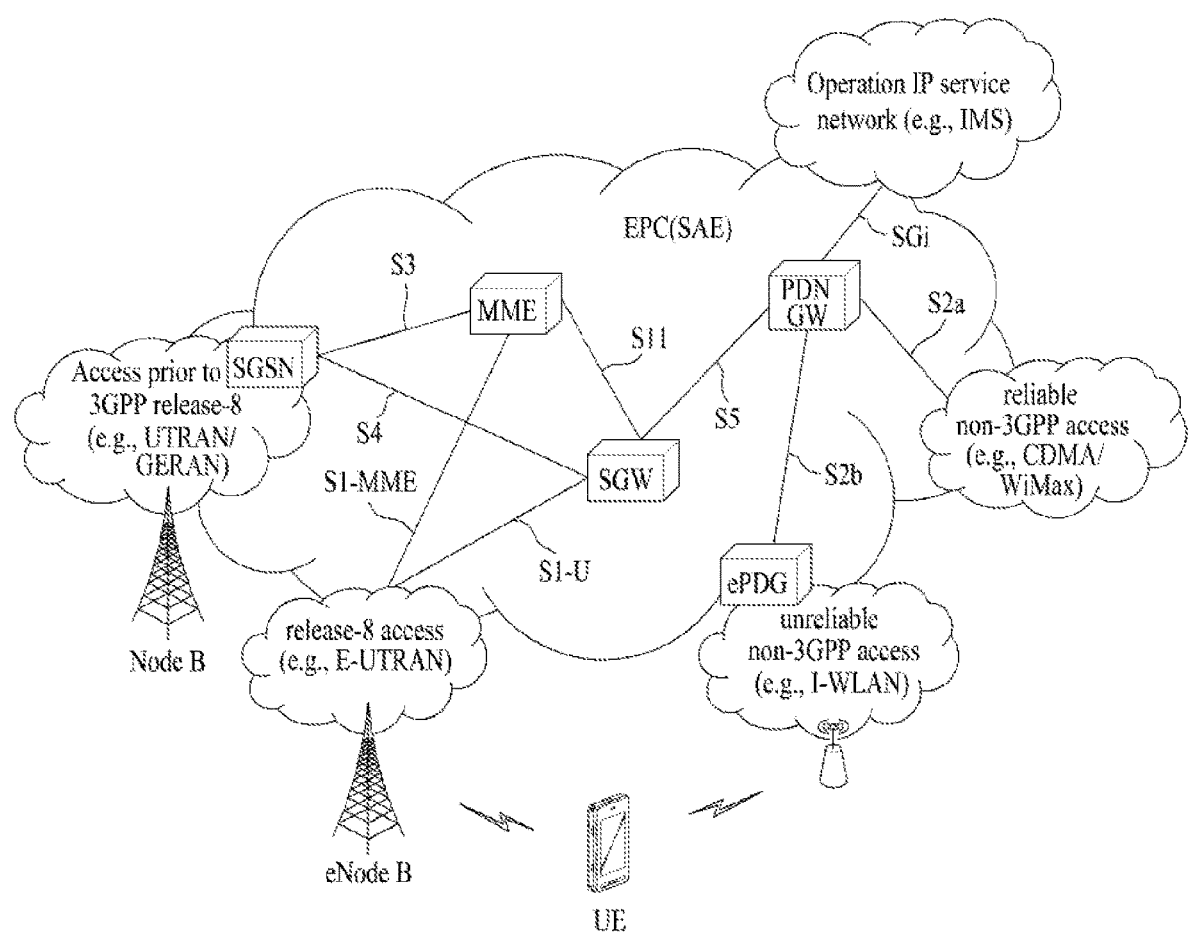
FIG. 1 is a schematic diagram illustrating the structure of an evolved packet system (EPS) including an evolved packet core (EPC).

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

eRelay-UE: a Layer 2 relay in which a UE supports Indirect 3GPP Communication between an eRemote-UE and the 3GPP network, using E-UTRA, WLAN or Bluetooth between the eRemote-UE and the relay. In the present disclosure, the eRelay-UE may be referred to as 'ProSe UE-to-Network Relay', 'UE-to-Network Relay', 'Relay', 'Relay UE', 'eRelay', 'Evolved ProSe UE-to-Network Relay', etc.

eRemote-UE: a UE that is connected to a network using an Indirect 3GPP Communication. In the present disclosure, the eRemote-UE may be referred to ProSe Remote 'UE', 'Remote UE', 'Remote', 'eRemote', 'Evolved ProSe Remote UE', etc.

Model A discovery: involves one UE announcing 'I am here'. This model defines two roles for ProSe-enabled UEs participating in ProSe direct discovery. The first role is an announcing UE that announces information to be used by UEs in proximity that have permission to discover. The second role is a monitoring UE that has an interest in information in proximity of an announcing UE.

Model B discovery: involves one UE asking 'who is there' and/or 'are you there'. This model defines two roles for ProSe-enabled UEs participating in ProSe direct discovery. The first role is a discoverer UE that transmits a request containing information about things the UE is interested in for discovery. The second role is a discoveree UE that receives a request message in response to information related to a discoverer's request.

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
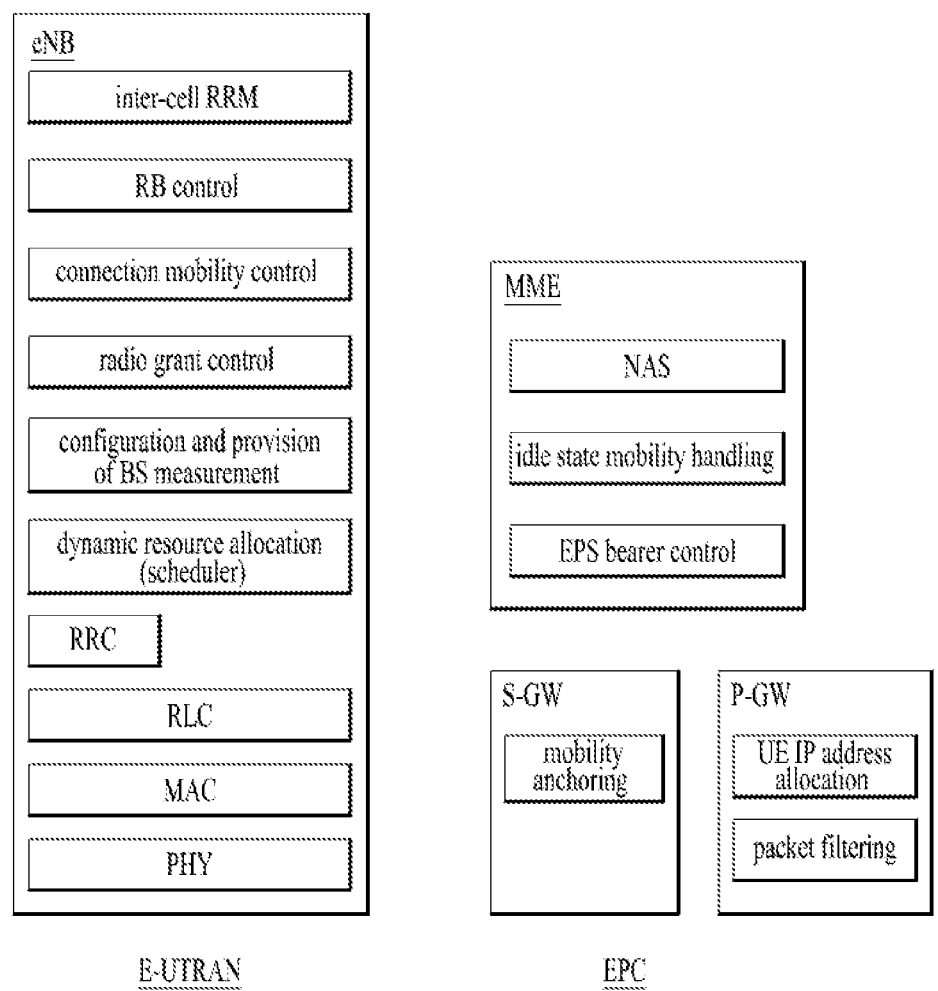
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
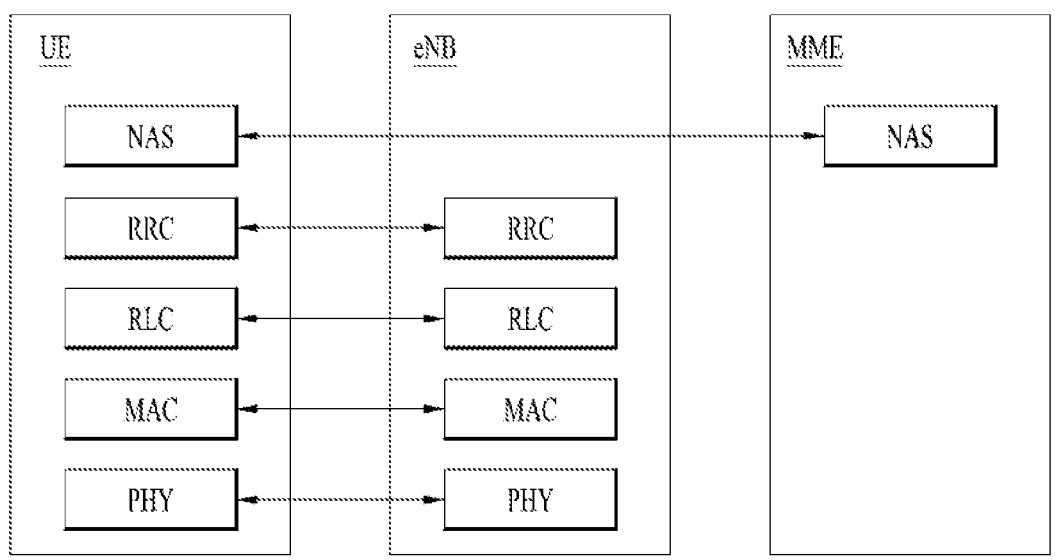
FIG. 3 is a diagram illustrating the structure of a radio interface protocol in a control plane.
Figure 4:
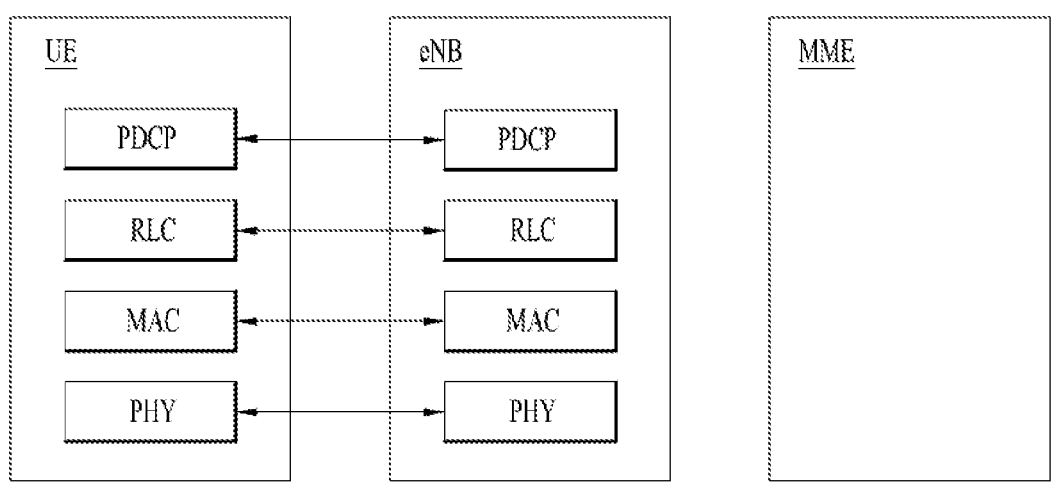
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, a description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, a description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
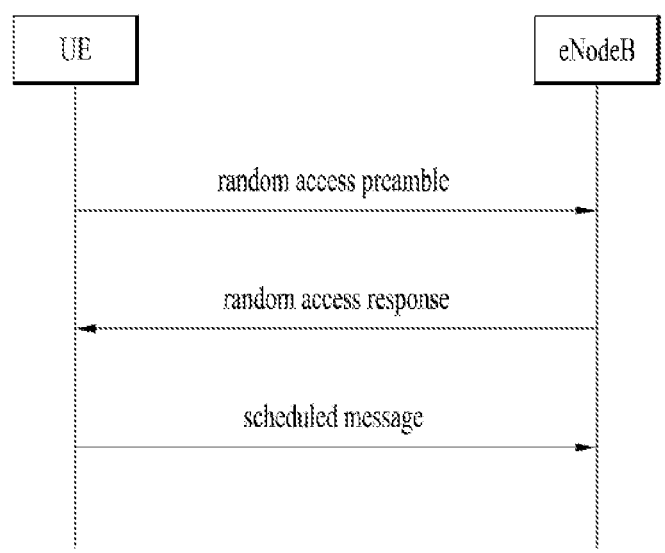
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
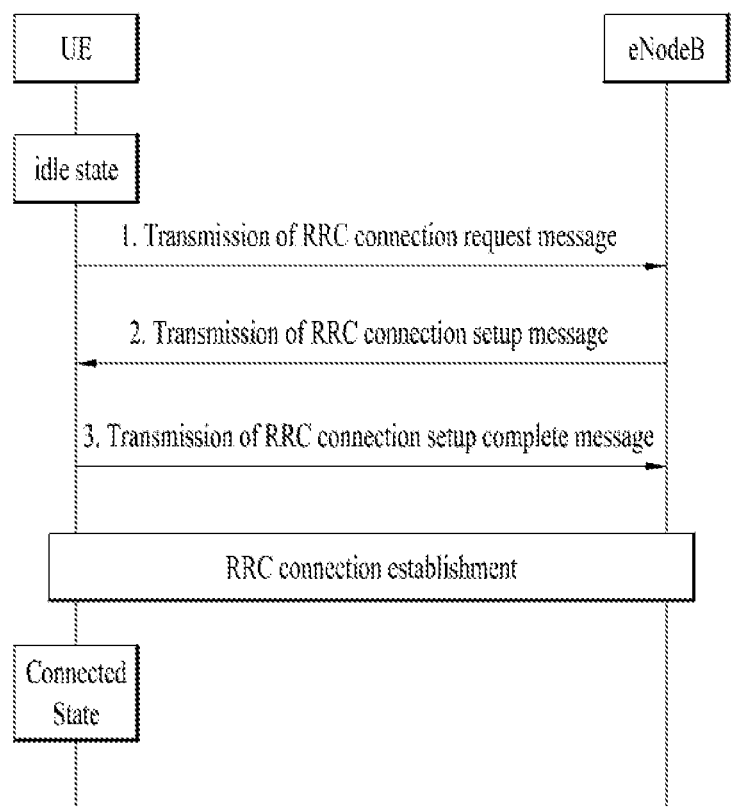
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
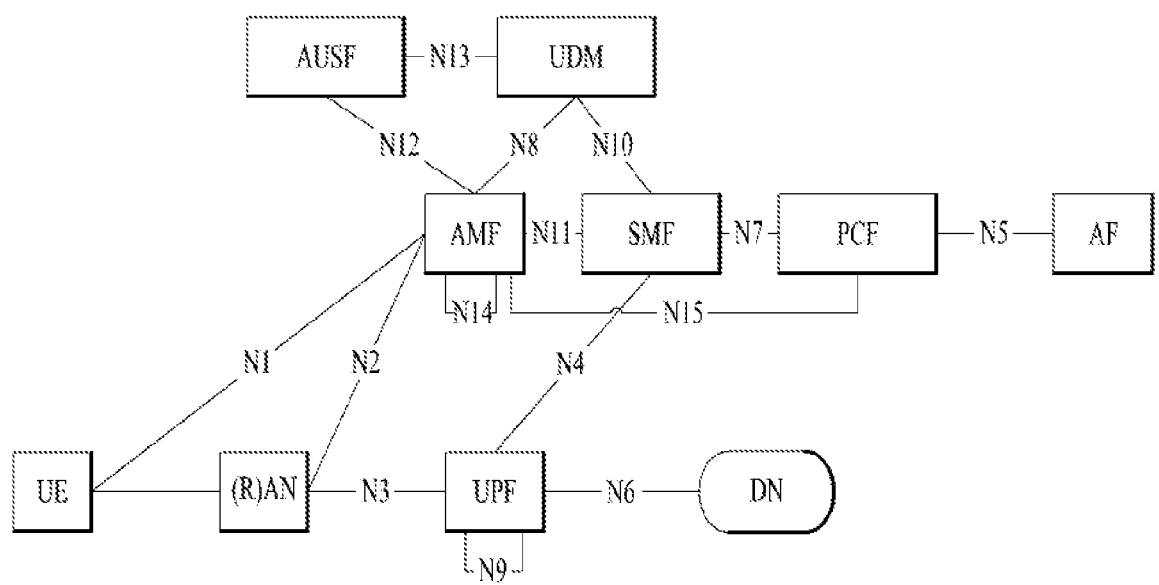
FIG. 7 is a diagram illustrating a $5^{th}$ generation (5G) system.

In a next generation system (i.e., 5G core network (CN)), the functionality of an MME in the legacy EPC may be divided into a Core Access and Mobility Management Function (AMF) and a Session Management Function (SMF). The AMF is in charge of NAS interaction with the UE and mobility management (MM), and the SMF is in charge of session management (SM). In addition, the SMF manages a user plane function (UPF), which corresponds to a gateway for routing user traffic, i.e., managing a user plane. This may be interpreted to mean that the SMF manages the control plane of an S-GW and a P-GW in the legacy EPC and the UPF manages the user plane thereof. For user traffic routing, at least one UPF may exist between a RAN and a data network (DN). In other words, the legacy EPC may be implemented in the 5G system as illustrated in FIG. 7. The 5G system defines a protocol data unit (PDU) session as a concept related to a PDN connection in the legacy EPS. The PDU session refers to association between the UE and the DN that provides PDU connectivity services and may be divided into a PDU session of IP type, a PDU session of Ethernet type, and a PDU session of unstructured type. Unified data management (UDM) serves as an HSS of the EPC, and a policy control function (PCF) serves as a PCRF of the EPC. To satisfy the requirements of the 5G system, these functions may be extended and provided. Details of the 5G system architecture, individual functions, and individual interfaces may be found in TS 23.501.

In 3GPP Release 14, SA1 works on service requirements to enable even a non-public safety UE to receive a network access service through a relay UE. A wearable device is mainly discussed as the UE that receives the network access service through the relay UE. The objectives of WID (remote UE access via relay UE (REAR)) for service requirements are described below (see SP-160511). The objective of this work item is to specify service requirements for a UE with UICC to access the network via an Evolved ProSe UE-to-Network Relay. It is assumed that the Evolved ProSe UE-to-Network Relay uses the E-UTRAN to access the EPC. To this end, the content in Table 2 is considered.

TABLE 2

The communication between the Evolved ProSe Remote UE and the Evolved ProSe UE-to-Network Relay to use either E-UTRA or WLAN.
The 3GPP system to support a user traffic session of an Evolved ProSe Remote UE to be relayed to the network via an Evolved ProSe UE-to-Network Relay.
Note: The Evolved ProSe Remote UE has the functionality to directly connect to the EPC without a relay.
Security related requirements for communication from the Evolved ProSe Remote UE to the EPC.
Evaluate what 3GPP services that the 3GPP system will be able to support on an Evolved ProSe Remote UE connecting through an Evolved ProSe UE-to-Network Relay including e.g. emergency calls. In addition, it is also needed to consider if the 3GPP system need to support service continuity or fallback (e.g: CS Fallback) for those services:
Service requirements regarding different ownership and different HPLMNs of the Evolved ProSe Remote UE and Evolved ProSe UE-to-Network Relay.
Basic service requirements regarding charging aspects for respective MNO subscriptions.
What roaming scenarios that the 3GPP system will support regarding roaming of an Evolved ProSe Remote UE and connecting though an available Evolved ProSe UE-to-Network Relay in the visited network or a roaming relay UE.
Service requirements regarding UE consent and/or MNO control of an Evolved ProSe Remote UE connecting through an Evolved ProSe UE-to-Network Relay.
Service requirements on QoS for the services provided to an Evolved ProSe Remote UE connected via a Evolved ProSe UE-to-Network Relay.
Service requirements regarding PLMN selection.
Lower power consumption and lower complexity aspects for the Evolved ProSe Remote UE.
Evaluate the enhancements anticipated from this WID and investigate evolving ProSe Rel 12 and Rel 13 concepts for ProSe UE-to-Network Relay to use Evolved ProSe UE-to-Network Relay.
Consideration of co-existence with ProSe Rel 12 and Rel 13 services and users including shared radio spectrum cases
Consideration of efficient use of LTE radio spectrum (especially when shared between in-coverage and out-coverage Evolved ProSe Remote UEs).

TABLE 2-continued

Support QoS concepts (according to TS23.203 and TS23.401) to allow to prioritization of high priority users and services both in-coverage of cell and out-of-coverage ProSe users and UEs served by Evolved ProSe-UE-to-Network Relays.

The details of the service requirements for the REAR may be found in sections 7B (Indirect 3GPP Communication) and 7C (Requirements for relay UE selection for Evolved ProSe remote UE access via an Evolved ProSe UE-to-Network Relay) of TS 22.279. A solution for satisfying the REAR service requirements is under development in TR 36.746. Particularly, the various scenarios shown in FIG. 8 are described in section 4.3.

Figure 8:
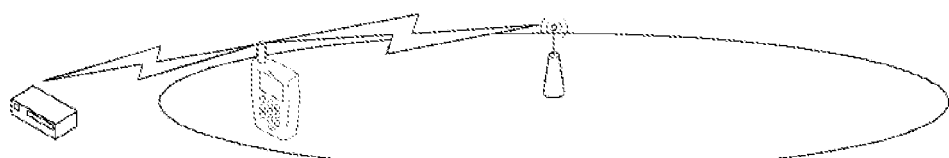
FIG. 8 is a diagram showing various relay scenarios.
Figure 8:
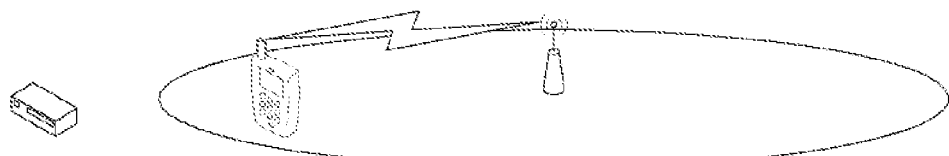
Figure 8:
Figure 8:
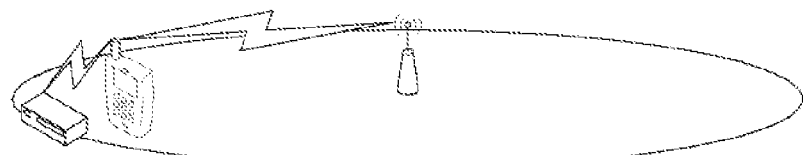

In FIG. 8, 'in coverage' for the Evolved ProSe Remote UE may include extended coverage. In the following, the term "linked" may mean that a short-range link is configured between the Evolved ProSe Remote UE and the Evolved ProSe UE-to-Network Relay UE and the two UEs are capable of exchanging data in any direction. For PC5, the "linked" state may mean a state in which a PC5 connection is established. It is assumed that if necessary, trust relationship between the Evolved ProSe Remote UE and the Evolved ProSe UE-to-Network Relay UE is handled by higher layers. The state in which trust relationship is established is defined as the "associated" state.

In Scenario 2 of FIG. 8, either the Evolved ProSe Remote UE or the network may establish a link between the Evolved ProSe Remote UE and the Evolved ProSe UE-to-Network Relay UE. In Scenario 3, either the Evolved ProSe Remote UE or the network may establish a link between the Evolved ProSe Remote UE and the Evolved ProSe UE-to-Network Relay UE. Additional restrictions may be required when the network initiates the establishment.

The Evolved ProSe Remote UE is not required to be in RRC_CONNECTED while linked with the Evolved ProSe UE-to-Network Relay UE. The evolved ProSe UE-to-Network Relay UE may be in RRC_IDLE while linked with the Evolved ProSe Remote UE. The RRC connection state of the Evolved ProSe Remote UE and the Evolved ProSe UE-to-Network Relay UE may change independently of the connection state of PC5/non-3GPP access. Both the Evolved ProSe UE-to-Network Relay UE and the Evolved ProSe Remote UE are in RRC_CONNECTED while unicast data is relayed.

When the term "RRC_CONNECTED" is used to describe the Evolved ProSe Remote UE, it means that the UE has a context in the eNB. The Evolved ProSe UE-to-Network Relay UE may provide both unicast and multicast services.

As described above, the remote and relay UEs may not need to keep the RRC_CONNECTED state after establishing a connection therebetween. In addition, the RRC connection of the remote UE may change independently of the RRC connection of the relay UE, and vice versa. In TR 36.746 v1.0.0 (5.1.2.2 Paging for Evolved ProSe Remote UE), the following options: Options 1 to 3 are described as a method of paging a remote UE in the idle state.

a) Option 1

Figure 9:
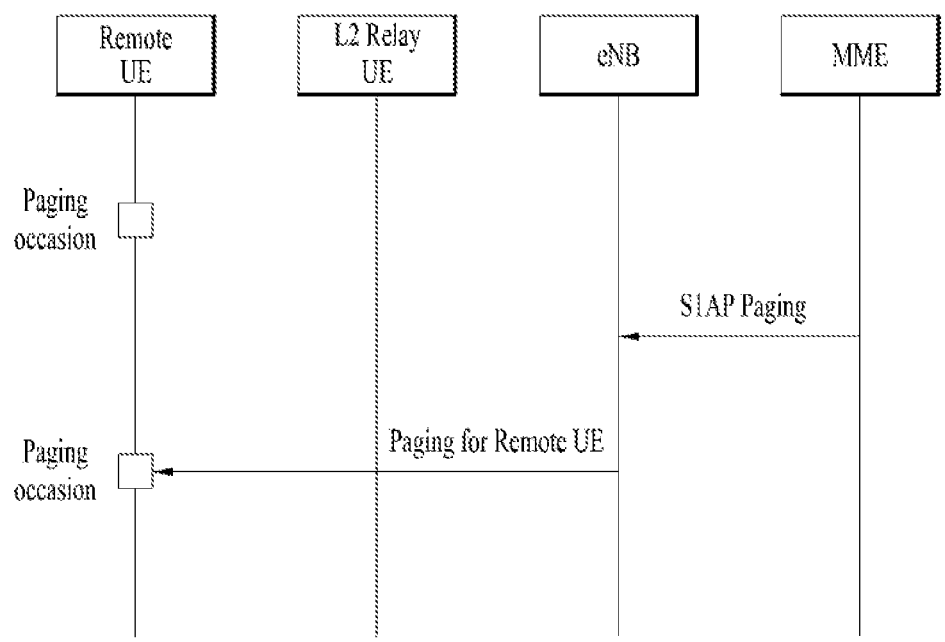
FIGS. 9 to 11 are diagrams illustrating methods capable of performing paging to a remote UE.

Since the Evolved ProSe Remote UE monitors its paging occasion (PO) over the Uu interface, the Evolved ProSe UE-to-Network Relay UE does not need to relay the paging for the Evolved ProSe Remote UE through a short-range link. The Evolved ProSe Remote UE with a single receiver needs to monitor the Uu only. The reason for this is that the Evolved ProSe Remote UE is incapable of being linked to the Evolved ProSe UE-to-Network Relay UE via the PC5 interface to transmit or receive data while monitoring POs via the Uu simultaneously. Option 1 is illustrated in FIG. 9. Option 1 is advantageous in that the Evolved ProSe UE-to-Network Relay UE does not need to relay the paging for the Evolved ProSe Remote UE through a short-range link so that additional power consumption for an L2 relay UE and additional use of sidelink (SL) resources are not required. However, Option 1 has the following disadvantages. It is not applicable when the Evolved ProSe Remote UE is out of E-UTRAN coverage. In addition, when the Evolved ProSe Remote UE is linked to the Evolved ProSe UE-to-Network Relay UE, the Evolved ProSe Remote UE needs to attempt paging reception in downlink and reception through a short-range link. As a result, the power efficiency of the Evolved ProSe Remote UE may be degraded.

b) Option 2

Figure 10:
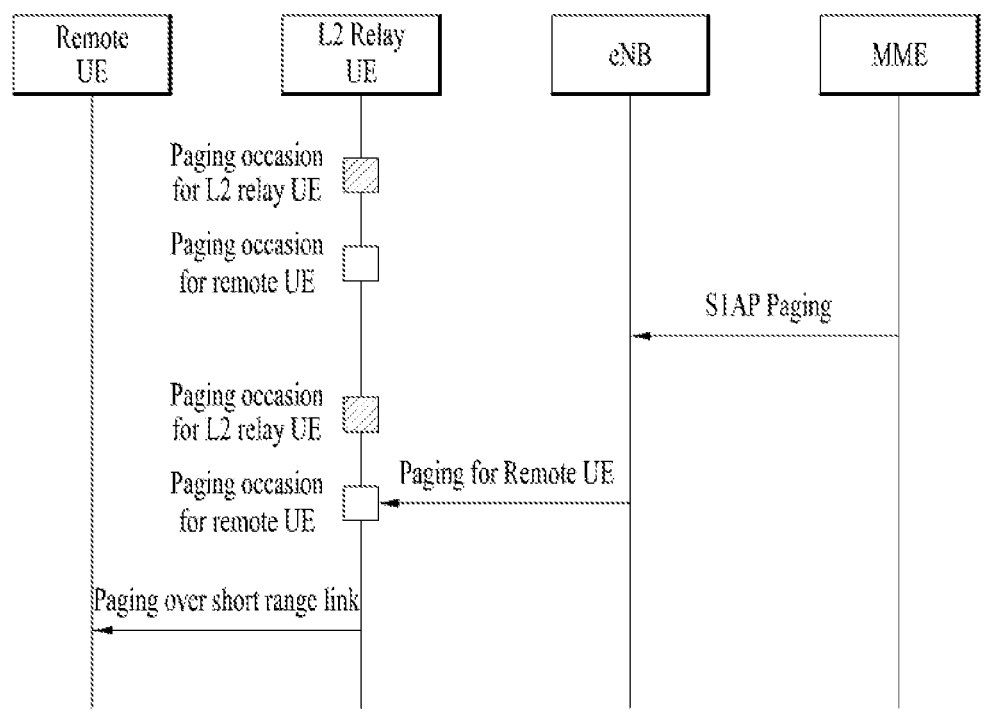

The Evolved ProSe UE-to-Network Relay UE monitors the PO of the linked Evolved ProSe Remote UE as well as its own PO. The Evolved ProSe Remote UE does not need to attempt paging reception in downlink while it is linked to the Evolved ProSe UE-to-Network Relay UE. The Evolved ProSe UE-to-Network Relay UE may need to monitor multiple POs. The Evolved ProSe UE-to-Network Relay UE needs to know the PO of the Evolved ProSe Remote UE, decode a paging message, and determine which Evolved ProSe Remote UE the paging is for. Further, the Evolved ProSe UE-to-Network Relay UE may need to relay the paging for the Evolved ProSe Remote UE over a short-range link. Option 2 is illustrated in FIG. 10.

Option 2 has the following advantages. It is commonly applicable to both when the Evolved ProSe Remote UE is in and out of E-UTRAN coverage. The Evolved ProSe Remote UE does not need to attempt paging reception in downlink while linked to the Evolved ProSe UE-to-Network Relay UE. Thus, the power efficiency of the Evolved ProSe Remote UE may be improved. The network does not need to know whether the Evolved ProSe Remote UE and the Evolved ProSe UE-to-Network Relay UE are linked or associated.

Meanwhile, Option 2 has the following disadvantages. The Evolved ProSe UE-to-Network Relay UE needs to monitor multiple POs. That is, since the power consumption may increase depending on the number of Evolved ProSe Remote UEs linked to the Evolved ProSe UE-to-Network Relay UE, the power efficiency of the Evolved ProSe UE-to-Network Relay UE may decrease. The Evolved ProSe UE-to-Network Relay UE needs to relay the paging for the Evolved ProSe Remote UE through a short-range link. As a result, additional power consumption for the Evolved ProSe UE-to-Network Relay UE and additional use of SL resources are required.

c) Option 3

Figure 11:
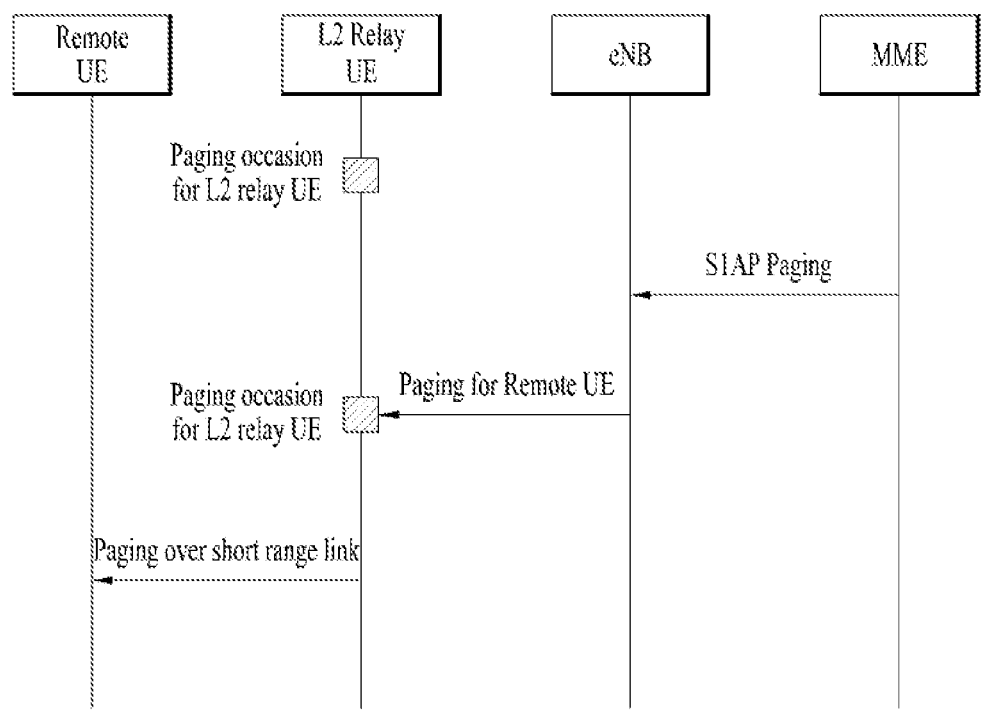

The Evolved ProSe UE-to-Network Relay UE monitors its own PO only, and the paging for the linked Evolved ProSe Remote UE is transmitted on the PO of the Evolved ProSe UE-to-Network Relay UE. The Evolved ProSe Remote UE does not need to attempt paging reception in downlink while linked to the Evolved ProSe UE-to-Network Relay UE. The Evolved ProSe UE-to-Network Relay UE needs to decode a paging message, determine which Evolved ProSe Remote UE the paging is for, and relay the paging for the Evolved ProSe Remote UE through a short-range link. To page the Evolved ProSe Remote UE, the CN (i.e. MME) needs to know the link state between the Evolved ProSe UE-to-Network Relay UE and the Evolved ProSe Remote UE and perform remapping such that the paging message of the Evolved ProSe Remote UE occurs on the PO of the Evolved ProSe UE-to-Network Relay UE. Option 3 is illustrated in FIG. 11.

Option 3 has the following advantages. It is commonly applicable to both when the Evolved ProSe Remote UE is in and out of E-UTRAN coverage. The Evolved ProSe Remote UE does not need to attempt paging reception in downlink while linked to the Evolved ProSe UE-to-Network Relay UE. This may improve the power efficiency of the Evolved ProSe Remote UE. The Evolved ProSe UE-to-Network Relay UE does not need to monitor multiple POs. In this case, the power efficiency of the Evolved ProSe UE-to-Network Relay UE further increases compared to Option 2.

Meanwhile, Option 3 has the following disadvantages. The Evolved ProSe UE-to-Network Relay UE needs to relay the paging for the Evolved ProSe Remote UE through a short-range link, and this may cause additional power consumption for the Evolved ProSe UE-to-Network Relay UE and additional use of SL resources. The network needs to know the link state between the Evolved ProSe UE-to-Network Relay UE and the Evolved ProSe Remote UE.

According to Option 1 among the above-described paging methods for the remote UE, since the remote UE checks whether there is paging for the remote UE, the remote UE does not need any assistance from the relay UE regarding the paging. However, when the remote UE is out of coverage, the remote UE is incapable of checking whether there is paging for the remote UE. According to Options 2 and 3, the remote UE does not check whether there is paging for the remote UE, but the relay UE does. That is, even the out-of-coverage remote UE may be supported. However, these options may cause various impacts to the relay UE and network.

To overcome the above issues, the present disclosure describes a method of efficiently delivering a network access service (Indirect 3GPP Communication) to a remote UE through a relay UE, and more particularly, a method of efficiently delivering mobile terminating traffic to an out-of-coverage remote UE.

Herein, the connected state may refer to either or both the RRC_CONNECTED state and the ECM_CONNECTED state, and the idle state may refer to either or both the RRC_IDLE state and the ECM_IDLE state. In addition, the term "in-coverage" may be interpreted to mean "in E-UTRAN coverage" or "served by E-UTRAN", and the term "out-of-coverage (OoC)" may be interpreted to mean "out of E-UTRAN coverage" or "not served by E-UTRAN". The mobile terminating traffic may include not only data (i.e., user traffic) but also singling to the remote UE (e.g., NAS signaling).

Embodiment 1

The eNB may receive OoC-related information on the remote UE. After receiving the OoC-related information, the eNB may determine to keep both the remote UE and the relay UE for the remote UE in the connected state. When the OoC-related information on the remote UE is transmitted to the eNB and/or MME, the network may keep the remote UE and the relay UE in the connected state. If the remote UE and/or the relay UE is in the idle state, the remote UE and/or the relay UE may switch to the connected state and then keep the connected state.

The remote UE or the relay UE may naturally switch from the idle state to the connected state by transmitting the network a RRC Connection Request message, a Service Request message, an Attach Request message, etc. When the eNB leads to keeping the remote UE and the relay UE in the connected state, the eNB does not start any inactivity timers for the two UEs, that is, the eNB does not initiate an S1 release procedure to keep the two UEs in the connected state. In other words, when the eNB determines to keep the remote UE and the relay UE in the connected state, the eNB may not start any inactivity timers to prevent both the remote UE and the relay UE from switching to the idle state. Meanwhile, when the MME leads to keeping the remote UE and the relay UE in the connected state, even if the eNB requests the MME to perform the S1 release procedure, the MME may reject the request to keep the two UEs in the connected state.

Thereafter, upon receiving downlink data towards the remote UE, the relay UE forwards the received downlink data to the remote UE. In this case, no paging is required since the remote UE and the relay UE are in the connected state. When the eNB determines to keep the remote UE and the relay UE in the connected mode, the eNB may not always perform paging although the eNB has downlink data to transmit to the relay UE.

With the above configuration, when the remote UE is in coverage (i.e., when the remote UE is capable of directly receiving paging from the eNB or when the remote UE is capable of checking the presence of paging over LTE-Uu), the remote UE may check the presence of paging. When the remote UE is out of coverage (i.e., when the remote UE is incapable of directly receiving paging from the eNB or when the remote UE is incapable of checking the presence of paging over LTE-Uu), the remote UE and the relay UE may be allowed to maintain the connected state. Thus, when there is mobile terminating traffic towards the remote UE, the mobile terminating traffic may be transmitted to the remote UE through the relay UE without paging.

The OoC-related information may correspond to one of the following information: information indicating whether the remote UE is out of coverage; information about the signal strength/state of the LTE-Uu (this may be interpreted as an interface towards the network) of the remote UE; information indicating that the remote UE is not (directly) reachable to the network; and information indicating that communication through the LTE-Uu is impossible. Specifically, the information indicating whether the remote UE is out of coverage may be provided in various ways. For example, the information may be provided in the form of a flag/indicator or as information about a cell where the remote UE is located (if a cell ID with a NULL value or a specific cell ID indicating the OoC state is included, the OoC state may be regarded). The information about the signal strength/state of the LTE-Uu (this may be interpreted as an interface towards the network) of the remote UE may indicate the actual signal strength or levels such as high/medium/low/null. For example, when the signal strength is less than or equal to a specific threshold, the OoC state may be regarded. When the signal level is null, the OoC state may be regarded.

When the remote UE is in coverage, the eNB may receive in-coverage-related information from the remote UE. Details will be described in the following.

The in-coverage-related information on the remote UE may explicitly or implicitly indicate at least one of the following information i) to iv).

I) Information indicating whether the remote UE is in coverage (The information may be represented in various forms. For example, it may be provided as a flag/indicator or as information about a cell where the remote UE is located.)

II) Information about the signal strength or state of the LTE-Uu (this may be interpreted as an interface towards the network) of the remote UE (The information may indicate the actual signal strength or levels such as high/medium/low/null. For example, when the signal strength is more than or equal to a specific threshold, the in-coverage state may be regarded. When the signal level is high, medium, or null, the in-coverage state may be regarded.

III) Information indicating that the remote UE is (directly) reachable to the network IV) Information indicating that the remote UE is capable of performing communication through the LTE-Uu The remote UE may transmit the in-coverage-related information to the eNB and/or MME in at least one of the following cases: when the remote UE in the connected state is in the coverage and when the remote UE in the in-coverage state attaches to the network. The relay UE may or may not obtain/store the in-coverage-related information on the remote UE. The MME may refer to the serving MME of the remote UE or the serving MME of the relay UE. It is assumed that if the two UEs have different serving MMEs, the in-coverage-related information on the remote UE is delivered to both the MMEs.

The remote UE may provide the in-coverage-related information to the relay UE (the information may be provided in various ways, for example, using a PC5-S message, a PC5-D message, a newly defined PC5 message, etc. Alternatively, the information may be included in an RRC message, which is transmitted by the remote UE to the eNB through the relay UE, and/or a NAS message, which is transmitted to the MME), and the relay UE may forward the in-coverage-related information to the eNB and/or MME. Alternatively, the remote UE may directly transmit the in-coverage-related information to the eNB and/or MME.

When the in-coverage-related information on the remote UE is transmitted to the eNB and/or MME, the network may determine that the remote UE and the relay UE do not need to maintain the connected state. This may be interpreted to mean that, as in the prior art, when it is determined that a UE needs to switch from the connected state to the idle state, the S1 release operation is performed for the UE. For example, upon receiving the in-coverage-related information, the eNB may start the inactivity timer. That is, when the eNB determines that an S1-U is no longer required for the UE, the eNB may allow the UE to switch to the idle state by operating the inactivity timer. In summary, the remote UE may operate in either the idle or connected mode depending on situations. Thus, when the eNB has downlink data to transmit, the eNB may transmit either a paging message or the downlink data after receiving the in-coverage-related information.

Meanwhile, the remote UE may transmit the OoC-related information in at least one of the following cases: a) when the remote UE in the idle state is out of the coverage; b) when the remote UE in the OoC state attaches to the network; and c) when the remote UE in the connected state is out of the coverage. Each case will be described in detail with reference to FIGS. 12 to 14. The relay UE may or may not obtain/store the OoC-related information on the remote UE. The MME may refer to the serving MME of the remote UE or the serving MME of the relay UE. It is assumed that if the two UEs have different serving MMEs, the OoC-related information on the remote UE is delivered to both the MMEs. The remote UE may provide the OoC-related information to the relay UE (the information may be provided in various ways, for example, using a PC5-S message, a PC5-D message, a newly defined PC5 message, etc. Alternatively, the information may be included in an RRC message, which is transmitted by the remote UE to the eNB through the relay UE, and/or a NAS message, which is transmitted to the MME), and the relay UE may forward the OoC-related information on the remote UE to the eNB and/or MME. Alternatively, the remote UE may directly transmit the OoC-related information to the eNB and/or MME.

Figure 12:
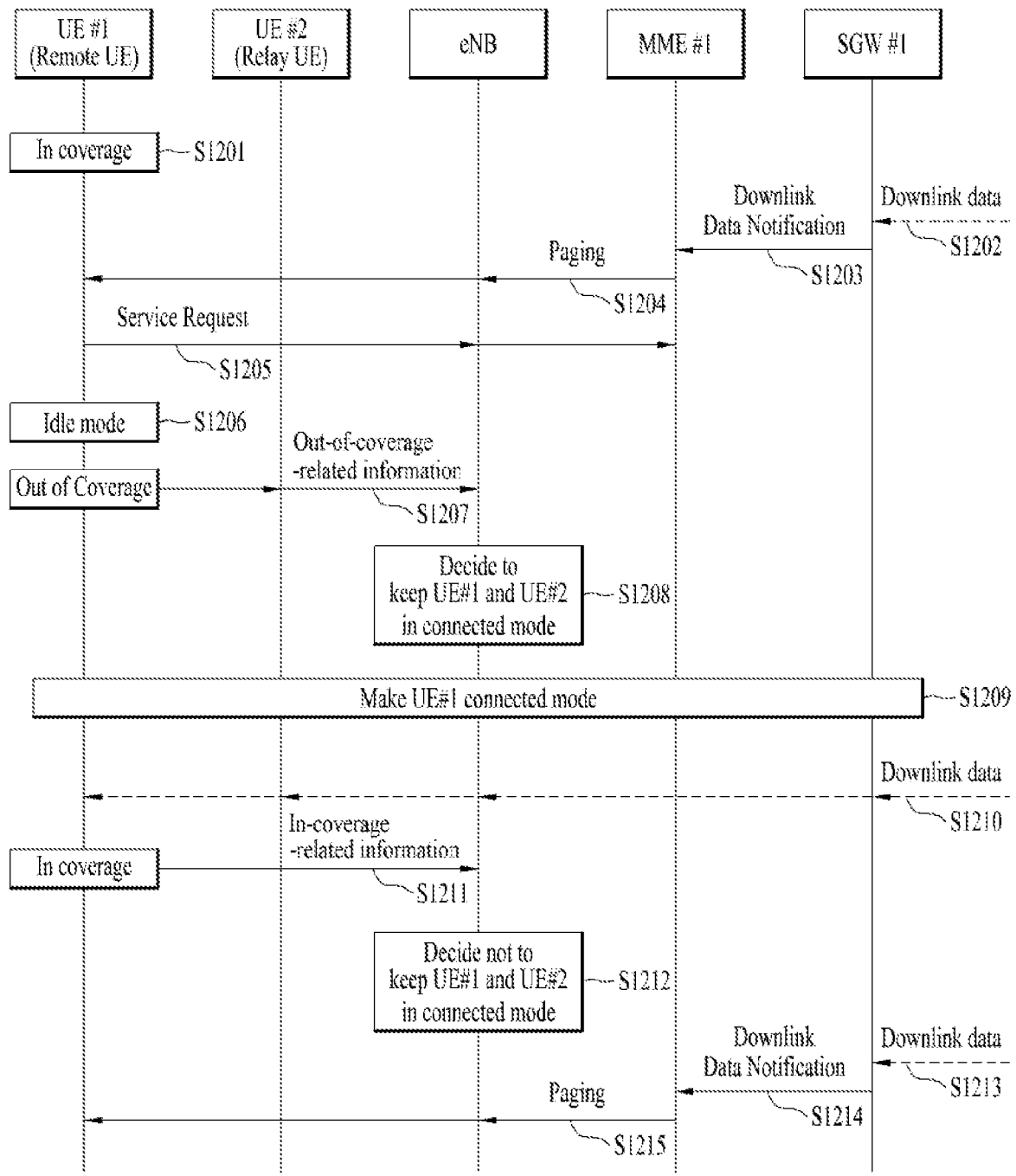
FIGS. 12 to 14 are diagrams for explaining embodiments of the present disclosure.

The remote UE may be out of coverage while in the idle state. In this case, the eNB may activate the user plane of the remote UE to allow the remote UE to switch to the connected state. FIG. 12 illustrates a related example. Specifically, FIG. 12 shows a case in which the remote UE moves out of coverage while in the idle state. It is assumed that the remote UE attaches to the network and the serving MME and serving S-GW of the remote UE are MME #1 and S-GW #1, respectively.

In step S1201 to S1205, since the remote UE (UE #1) is in the coverage, the remote UE may directly receive paging from the network. Upon receiving the paging, the remote UE in the idle state may perform a Service Request procedure to the network in order to receive downlink data. In step S1206, the remote UE is in the idle state. In step S1207, if the remote UE recognizes that it is out of the coverage, the remote UE transmits OoC-related information to the network through the relay UE (UE #2). If the remote UE is still capable of directly communicating with the network, the remote UE may directly transmit the OoC-related information to the network, instead of using the relay UE.

In step S1208, the eNB, which serves the remote UE and the relay UE, may determine that it is necessary to keep the two UEs in the connected state. In step S1209, the eNB may allow the remote UE to switch to the connected state by activating the user plane of the remote UE. It is assumed that the relay UE already entered the connected state to forward the OoC-related information received from the remote UE in step S1207 or due to another remote UE. In step S1210, upon receiving downlink data towards the remote UE, the S-GW of the remote UE forwards the downlink data to the eNB which already connected the user plane. The downlink data is transmitted to the remote UE through the relay UE.

In step S1211, if the remote UE recognizes that it is in the coverage, the remote UE transmits in-coverage-related information to the network. This information may be transmitted through the relay UE to the network. In step S1212, the eNB serving the remote UE and the relay UE determines that it is no longer necessary to keep the two UEs in the connected state. Thus, the eNB may activate an inactivity timer for each of the two UEs again. Thereafter, the remote UE enters the idle state since there is no mobile originated and mobile terminated data/signal towards the remote UE for a while. In steps S1213 to S1215, since the remote UE is in the coverage, the remote UE is capable of directly receiving paging from the network. Upon receiving the paging, the remote UE in the idle state performs the Service Request procedure to the network in order to receive downlink data.

Figure 13:
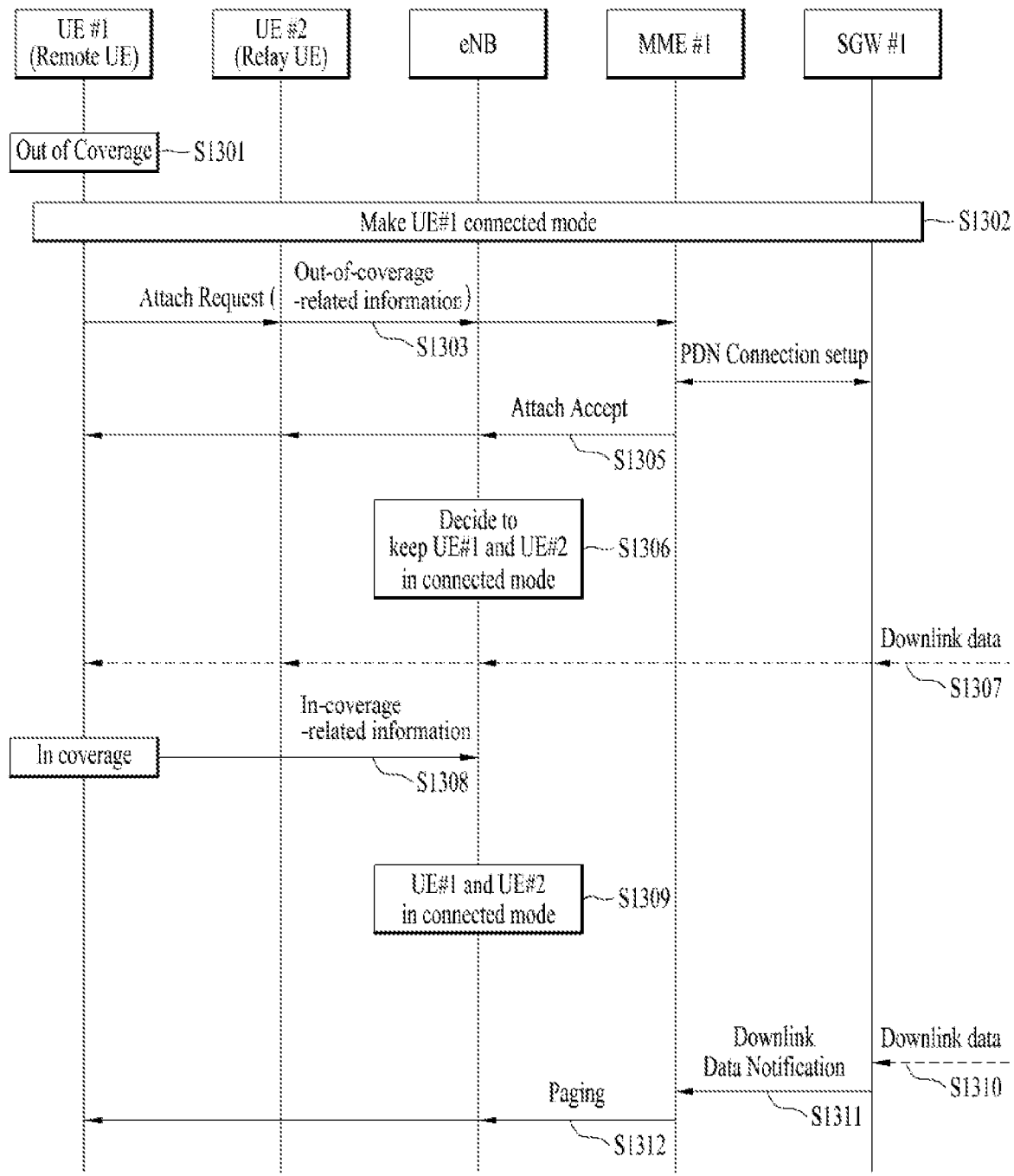

As another example, the remote UE may attach to the eNB through the relay UE while out of coverage. FIG. 13 illustrates a related example. Referring to FIG. 13, In step S1301, the remote UE (UE #1) is out of coverage. In step S1302, the remote UE searches for the relay UE and establishes a one-to-one direct link with UE #2, which is the selected relay UE. In step S1303, the remote UE transmits an Attach Request message to the network through the relay UE. The Attach Request message contains OoC-related information. This may be interpreted to mean that the Attach Request message, which is a NAS message, and/or an RRC message including the NAS message includes the OoC-related information. The Attach Request message is delivered through the relay UE and the eNB to MME #1, which serves the remote UE. In step S1304, a PDN Connection Setup procedure is performed as an Attach operation. In step S1305, MME #1 transmits an Attach Accept message to the remote UE.

In step S1306, the eNB that serves the remote UE and the relay UE determines that it is necessary to keep the two UEs in the connected state. The eNB may determine to keep the two UEs in the connected state based on the OoC-related information included in the RRC message transmitted from the remote UE in step S1303. Alternatively, MME #1 may explicitly or implicitly indicate that the eNB needs to keep the two UEs in the connected state based on the OoC-related information from the remote UE. In step S107, upon receiving downlink data towards the remote UE, the S-GW of the remote UE forwards the downlink data to the eNB which already connected a user plane. The downlink data is transmitted to the remote UE through the relay UE.

Since steps S1308 to S1312 are equivalent to steps S1211 to S1215 of FIG. 12, details thereof will be omitted.

Figure 14:
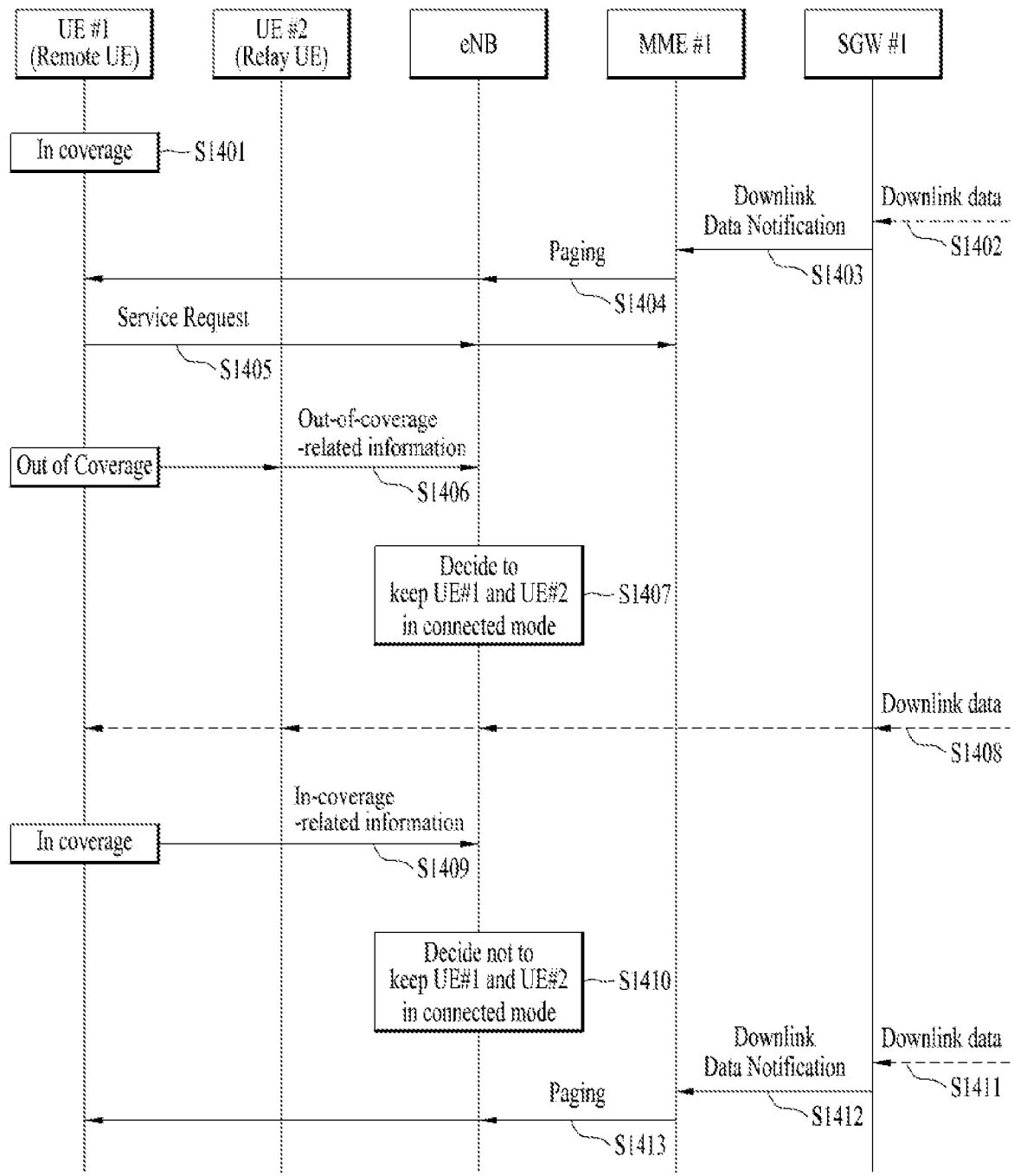

As a further example, the remote UE may become out of coverage while in the connected state. FIG. 14 illustrates a related example. It is assumed that the remote UE attaches to the network and the serving MME and serving S-GW of the remote UE are MME #1 and S-GW #1, respectively. Referring to FIG. 14, in steps S1401 to S1405, since the remote UE (UE #1) is in coverage, the remote UE may directly receive paging from the network. Upon receiving the paging, the remote UE in the idle state may perform the Service Request procedure to the network in order to receive downlink data.

In step S1406, if the remote UE recognizes that it is out of the coverage, the remote UE transmits OoC-related information to the network. In this case, the remote UE may transmit the information through the relay UE (UE #2) to the network.

In step S1407, the eNB that serves the remote UE and the relay UE determines that it is necessary to keep the two UEs in the connected state. In step S1408, upon receiving downlink data towards the remote UE, the S-GW of the remote UE forwards the downlink data to the eNB which already connected a user plane. The downlink data is transmitted to the remote UE through the relay UE.

Since steps S1409 to S1412 are equivalent to steps S1211 to S1215 of FIG. 12, details thereof will be omitted.

In the above description, the time at which the remote UE transmits the OoC-related information or in-coverage-related information to the network may be adjusted as follows.

The remote UE in the OoC state may switch to the in-coverage state. Then, after a while, the remote UE switches again to the OoC state. In other words, the remote UE may repeatedly switch between the OoC state and the in-coverage state. In this case, assuming that the remote UE provides the OoC-related information and the in-coverage-related information to the network, the remote UE needs to alternately provide the OoC-related information and the in-coverage-related information to the network during a short period of time. This may cause signaling overhead.

To solve the above problem, the remote UE may be configured to use a timer to manage/adjust the periodicity of providing the OoC/in-coverage-related information to the network. For example, when out of the coverage, the remote UE may transmit the OoC-related information to the network and then starts the timer. If the remote UE switches to the in-coverage state before expiration of the timer, the remote UE may not transmit the in-coverage-related information to the network. If the remote UE is still in the coverage after the expiration of the timer, the remote UE may transmit the in-coverage-related information to the network.

When the remote UE switches from the in-coverage state to the OoC state, the remote UE may provide the OoC-related information to the network if the remote UE is still out of the coverage after expiration of the timer. However, the remote UE may also provide the OoC-related information to the network without delay as soon as switching to the OoC state. The reason for this is that since the remote UE is incapable of directly receiving paging in the OoC state, the operation of keeping the remote UE and the relay UE in the connected state needs to be initiated.

Embodiment 2

Hereinafter, a description will be given of a method of efficiently delivering a network access service (Indirect 3GPP Communication) to the remote UE through the relay UE, and more particularly, a method by which the relay UE efficiently transmits to the remote UE system information the relay UE obtains from the network. The method may be implemented by combining at least one of the following configurations/operations/steps.

Tables 3 to 9 below are extracted from the documents which were made by the inventors of the present disclosure and submitted to the 3GPP organization. Details thereof are included in the scope of the present disclosure.

Hereinafter, a method by which an eRemote-UE requests an eRelay-UE to transmit/forward an SIB will be described. The eRemote-UE may request the eRelay-UE to transmit/forward the SIB at least one of the following times: i) when the eRemote-UE discovers the eRelay-UE; ii) when the eRemote-UE forms a one-to-one direct link with the eRelay-UE; and iii) after the eRemote-UE forms the one-to-one direct link with the eRelay-UE. The SIB refers to system information and may contain an MIB or various SIBs. This is applied throughout the present disclosure.

The eRemote-UE may request the eRelay-UE to transmit/forward the SIB according to at least one of the following methods. In this case, the eRemote-UE may request one or more SIBs. When the eRemote-UE requests forwarding of all SIBs, it may be represented by 'all'.

a) A PC5-D message is used. Specifically, a new parameter or information element is defined in an existing PC5-D message, or a new PC5-D message is defined.

b) A PC5-S message is used. Specifically, a new parameter or information element is defined in an existing PC5-S message, or a new PC5-S message is defined.

c) A PC5-U message, which is newly defined for the proposed SIB transmission, is used. For example, if values for requesting the SIB and values for providing the SIB are separately defined when 'System Information Type' IE values are defined, the eRemote-UE may indicate which SIB is required when requesting the SIB.

d) A new PC5-U message is defined to request the SIB. That is, by defining a new value, for example, 'SIB-Request' as the PDCP SDU type, the message may indicate which SIB(s) the eRemote-UE requests.

Although the present disclosure is described based on the EPS, the disclosure may be extended and applied to 5G systems. The present disclosure is applicable not only when relay and remote UE have the same serving MME (including an MME that servers the remote UE before the remote UE is out of coverage) but also when the relay and remote UEs have different serving MMEs.

Figure 15:
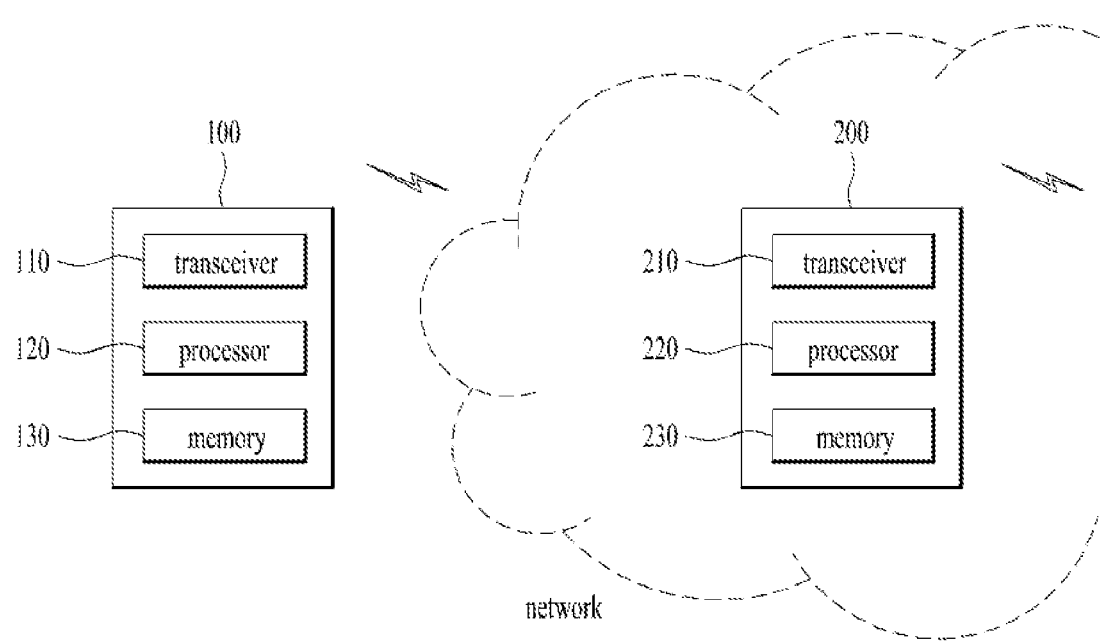
FIG. 15 is a diagram illustrating the configurations of node devices according to embodiments of the present disclosure.

FIG. 15 illustrates the configurations of a UE device and a network node device according to embodiments of the present disclosure.

Referring to FIG. 15, the UE device 100 according to the present disclosure may include a transceiver 110, a processor 120, and a memory 130. The transceiver 110 may be configured to transmit and receive various signals, data, and information to and from an external device. The UE device 100 may be connected to the external device by wire and/or wirelessly. The processor 120 may be configured to control the overall operations of the UE device 100 and process information to be exchanged between the UE device 100 and external device. The memory 130 may be configured to store the processed information during a predetermined time and replaced with a component such as a buffer (not shown in the drawing). In addition, the processor 120 may be configured to perform the UE operations proposed in the present disclosure.

Continuing to refer to FIG. 15, the network node device 200 may include a transceiver 210, a processor 220, and a memory 230. The transceiver 210 may be configured to transmit and receive various signals, data, and information to and from an external device. The network node device 200 may be connected to the external device by wire and/or wirelessly. The processor 220 may be configured to control the overall operations of the network node device 200 and process information to be exchanged between the network node device 200 and external device. The memory 230 may be configured to store the processed information during a predetermined time and replaced with a component such as a buffer (not shown in the drawing). In addition, the processor 220 may be configured to perform the network node operations proposed in the present disclosure. Specifically, the processor 220 may be configured to: receive OoC-related information on a remote UE; determine to keep the remote UE and a relay UE for the remote UE in the connected mode after receiving the OoC-related information on the remote UE; and transmit downlink data to the remote UE.

In the above-mentioned specific configurations of the UE device 100 and the network device 200, the contents or items explained in the descriptions of the various embodiments of the present disclosure may be independently applicable or two or more embodiments of the present disclosure may be simultaneously applicable. And, redundant descriptions shall be omitted from the following description for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A method of transmitting, by an evolved Node B (eNB), downlink data to a remote user equipment (UE) in a wireless communication system, the method comprising:
receiving, by the eNB, out-of-coverage-related information on the remote UE;
determining, by the eNB, to keep the remote UE and a relay UE for the remote UE in a connected mode after receiving the out-of-coverage-related information on the remote UE; and
transmitting the downlink data to the remote UE,
wherein, based on the out-of-coverage-related information informing the eNB that the remote UE has entered an out-of-coverage state, the eNB does not transmit a paging message by not initiating an inactivity timer for entering an idle mode, and
wherein based on the eNB receiving in-coverage-related information informing the eNB that the remote UE has entered an in-coverage state from the out-of-coverage state, the eNB transmits the paging message after expiration of an inactivity timer.

2. The method of claim 1, wherein the remote UE enters the out-of-coverage state while in an idle state.

3. The method of claim 2, wherein the eNB activates a user plane of the remote UE.

4. The method of claim 1, wherein the remote UE attaches to the eNB through the relay UE while in the out-of-coverage state.

5. The method of claim 1, wherein the remote UE enters the out-of-coverage state while in a connected state.

6. The method of claim 1, wherein the out-of-coverage-related information corresponds to one of the following: information on whether the remote UE is in the out-of-coverage state; information on a signal strength/state of LTE-Uu of the remote UE; information indicating that the remote UE is directly unreachable by the network; and information indicating that communication through the LTE-Uu is impossible.

7. The method of claim 1, wherein based on the remote UE being in the in-coverage state, the eNB receives in-coverage-related information from the remote UE.

8. The method of claim 7, wherein after receiving the in-coverage-related information, the eNB is capable of initiating an inactivity timer.

9. The method of claim 7, wherein after receiving the in-coverage-related information, the eNB transmits a paging message or the downlink data to the remote UE based on occurrence of the downlink data.

10. An evolved node B (eNB) device for transmitting downlink data to a remote user equipment (UE) in a wireless communication system, the eNB device comprising:
   a transceiver; and
   a processor,
   wherein the processor is configured to: receive out-of-coverage-related information on the remote UE; determine to keep the remote UE and a relay UE for the remote UE in a connected mode after receiving the out-of-coverage-related information on the remote UE; and transmit the downlink data to the remote UE,
   wherein, based on the out-of-coverage-related information informing the eNB that the remote UE has entered an out-of-coverage state, the eNB does not transmit a paging message by not initiating an inactivity timer for entering an idle mode, and
   wherein, based on the eNB receiving in-coverage-related information informing the eNB that the remote UE enter an in-coverage state from the out-of-coverage state, the eNB transmits the paging message after expiration of an inactivity timer.

* * * * *